United States Patent [19]

Hoerner

[11] Patent Number: 4,726,499

[45] Date of Patent: Feb. 23, 1988

[54] COLLAPSIBLE LOAD AND LIFT CARRIER ATTACHMENT FOR VEHICLES

[76] Inventor: Griffith I. Hoerner, 2211 Montana Ave., Santa Monica, Calif. 90403

[21] Appl. No.: 738,853

[22] Filed: May 29, 1985

[51] Int. Cl.⁴ .............................................. B60R 9/06
[52] U.S. Cl. .............................. 224/314; 224/42.03 B; 224/321; 224/329
[58] Field of Search ............... 224/314, 311, 319, 321, 224/330, 309, 42.05, 42.03 R, 42.03 B, 329

[56] References Cited

U.S. PATENT DOCUMENTS

| | | | |
|---|---|---|---|
| 2,432,732 | 12/1947 | Del Cano | 224/42.03 B |
| 3,670,935 | 6/1972 | Hinkston | 224/42.03 B |
| 3,710,999 | 1/1973 | Allen | 224/321 X |
| 4,009,744 | 3/1977 | Joslyn | 224/42.03 B X |
| 4,301,956 | 11/1981 | Hoerner | 224/311 |
| 4,336,897 | 6/1982 | Luck | 224/42.03 B |
| 4,354,625 | 10/1982 | Peoples | 224/314 |
| 4,434,922 | 3/1984 | Hoerner | 224/314 |
| 4,461,413 | 7/1984 | Hoerner | 224/314 |

Primary Examiner—Henry J. Recla
Assistant Examiner—David Voorhees
Attorney, Agent, or Firm—William H. Maxwell

[57] ABSTRACT

A load and lift carrier assembly and reassembly comprised of detachable legs and a header carried by mounting brackets secured to a vehicle body trunk lid or door by an anchor block captured within the body, the assembled condition being characterized by rigid attachment of the legs and header, the reassembled condition being characterized by insertion of the legs into the header, and featuring a reversible sack attached to the header and used one side out to transport articles and used the other side out to store the legs and header and related parts.

30 Claims, 14 Drawing Figures

COLLAPSIBLE LOAD AND LIFT CARRIER ATTACHMENT FOR VEHICLES

BACKGROUND OF THE INVENTION

This invention relates to load carriers that are removably attached to automotive vehicles for transporting bicycles and the like. Heretofore, racks have been attached to vehicle bodies, both permanently and replaceably, and in order to ensure a reliable attachment anchor plates and brackets, etc., have been secured onto or into the vehicle bodies; requiring for example, drilling and welding, or clamping methods of attachment. As a result, the vehicle body is mared and/or defaced as modification is made for the load carrier attachment. Furthermore, skilled time and effort is required to make such prior art installations, whether they be permanent or temporary. Therefore, it is a general object of this invention to provide a temporary load carrier for removable installation without modification or defacement to the vehicle body onto which it is reliably attached and adapted to support substantial loads, such as at least one bicycle or the like.

The unblemished cosmetic appearance of an auto body is a factor to be taken seriously. That is, it is to be preferred that the auto body remain undisturbed in every respect when the load carrier is removed. In other words, no drilled holes, marks or scratches should be permitted, and this requirement pertains to the interior as well as to the exterior of the auto body. Heretofore, mounting hardware has been fabricated into the vehicle construction as taught by my U.S. Pat. No. 4,461,413 issued July 24, 1984; interior anchors fastened into the body, with exterior cams bearing against the body exterior as taught by my U.S. Pat. No. 4,434,922 issued Mar. 6, 1984; and many other hooked on and screwed on rack structures proposed by the prior art are objectionable because they mutilate and/or deface the auto body. For example, screw fasteners produce holes, and cams and like localized pressure pads and brackets dent into the exterior surface of the auto body. Therefore, it is an object of this invention to provide an anchor and mount system which eliminates fasteners and does away with any modification to the interior or outer body surface. With the present invention, a strap enters through the "crack" between the auto body and trunk lid or any such closure door; and anchorage is by means of an enlargment at the dead end of the strap, that draws up to a stopped position inside the vehicle body. Accordingly, fasteners are entirely eliminated. With the present invention, the aforesaid strap is adjustably secured to a mounting bracket drawn firmly into engagement with the exterior of the auto body, the bracket being padded to protect the auto body finish.

Load carriers of the prior art have been characterized by the complications of folding legs that support a header (see U.S. Pat. Nos. 4,434,922 and 4,461,413). Rigidity in the erected condition has been ensured by complex hinge joints requiring numbers of parts; and even then collapse is a probability. It is therefore an object of this invention to provide a load carrier characterized by an easily erectable leg and header assembly wherein articulated joints are eliminated and replaced by rigidly pinned joints, also easily disassembled. A feature is that there is but one proper assembled condition, wherein the legs and header remain right angularly related.

The load carrier of the present invention is of the type wherein a securement strap draws the aforesaid legs and header into a stopped working position. As taught by said U.S. Pat. No. 4,434,922 a tensioning strap hooks onto a forwardly disposed edge of the trunk lid or door, and this strap is adjusted to draw a carrier into tight working position, and all of which is a satisfactory and acceptable type of arrangement that is utilized herein. However, this present invention does not utilize a cam action which tends to overpressure the auto body, and provides in place thereof an adjustable mounting bracket to which the legs of the load carrier are pinned. There can be several adjusted positions for the legs as they are angularly related to the rear of the auto body, the length of the tensioning strap being adjusted by buckle means to tightly position the load carrier with the header thereof elevated.

An object and feature of this load carrier is its derrick configuration, with davits or cranes that project rearward from the legs at the header level, for the support of at least one or more bicycles or other gear as the case may be. The position of the legs and davits can be static, or they can be dynamic by means of a tackle in place of the aforementioned tensioning straps, whereby the legs pivot on a common axis at the pinned connections to the lowermost mounting brackets.

It is an object of this invention to provide a collapsible load carrier of the character thus far described, and more particularly a load carrier of separable parts adapted to be quickly and easily assembled and disassembled as circumstances require. In accordance with this invention the structural members are a pair of legs and a header, and all of which are stowed in a collapsed condition within a reversible sack. That is, a sack is provided that contains the structural members for storage in a minimum of space, and that is alternately turned inside-out so as to expose the header for use and assembly with the legs. A feature is that the legs are stowed within the header, and the reversed inside-out sack is useable as an envelope for containment of other miscellaneous gear to be transported. The reversed inside-out sack is also used to cushion the load attached to the header, being made of a soft fabric and/or containing soft objects or padding.

SUMMARY OF THE INVENTION

This Collapsible Load And Lift Carrier Attachment For Vehicles, as it is disclosed herein, is an assembly of separable parts that are rearranged in a compact reassembly and stowed within a sack or envelope permanently attached to one of the structural parts. In practice, the header part is to be considered the main structural part into which the two other leg parts are inserted for compact storage, whereupon the sack is arranged right-side-out and shut to contain a telescoped arrangement of the parts. When assembled and errected for use, the sack is reversed to an inside-out condition so as to expose the header for assembly with the legs, and for the attachment of a load thereto. Each leg has a mounting bracket to which it is adjustably pinned, the bracket being padded for safe engagement with the auto body. A feature is the leg-bracket anchorage, through the trunk lid crack without any work or modification to the vehicle; this connection being adjustable to accomodate variations in vehicle construction. The final working condition is established by the tensioned attachment of the header drawn forwardly with the strap hooked to the forward edge of the trunk lid, the legs being adjustably positioned by stop pins inserted into the mounting brackets. With these structural parts assembled as described, they are rigid laterally and held longitudinally by the tensioning strap, the mounting brackets being anchored by the enlargements on the anchor straps captured within the auto body trunk cavity, which remains closed during use of the load carrier.

The foregoing and various other objects and features of this invention will be apparent and fully understood from the following detailed description of the typical preferred forms and applications thereof, throughout which description reference is made to the accompanying drawings.

THE DRAWINGS

FIG. 5 is an enlarged fragmentary view showing the basic attachment of the carrier members.

FIG. 6 is a view taken as indicated by line 6—6 on FIG. 5.

And, FIG. 7 is a perspective view of the end configuration of the header member of the carrier as shown in FIGS. 5 and 6.

FIG. 8 is an enlarged fragmentary view taken as indicated by line 8—8 on FIG. 1, showing the preferred and sophisticated embodiment and attachment of carrier members, including a davit member.

FIG. 9 is a view taken as indicated by line 9—9 on FIG. 8.

And, FIG. 10 is a perspective view of the end configuration of the header member of FIGS. 1, 8 and 9.

FIG. 11 is an enlarged fragmentary view showing the mounting bracket conditioned for installation.

FIGS. 12 and 13 are sectional views taken as indicated by lines 12—12 and 13—13 on FIG. 11.

And, FIG. 14 is an enlarged perspective view of the strap anchor shown in FIGS. 2, and 4, and which is a characteristic feature of this invention.

PREFERRED EMBODIMENT

Figure 1:
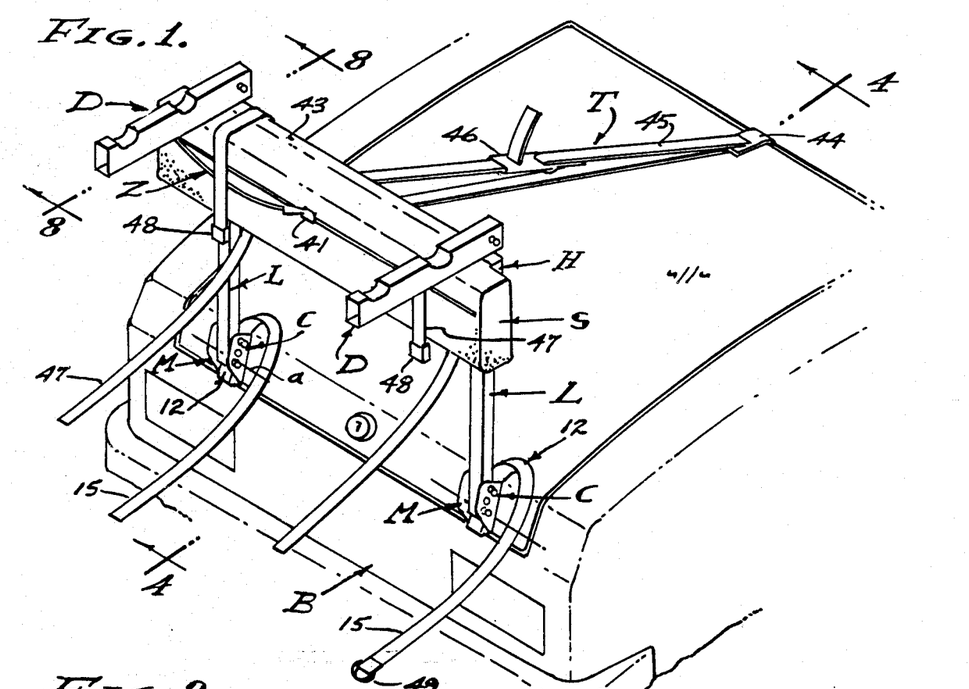
FIG. 1 is a perspective view of the preferred embodiment of the present invention showing the load carrier mounted to the trunk lid of an auto body.
Figure 4:
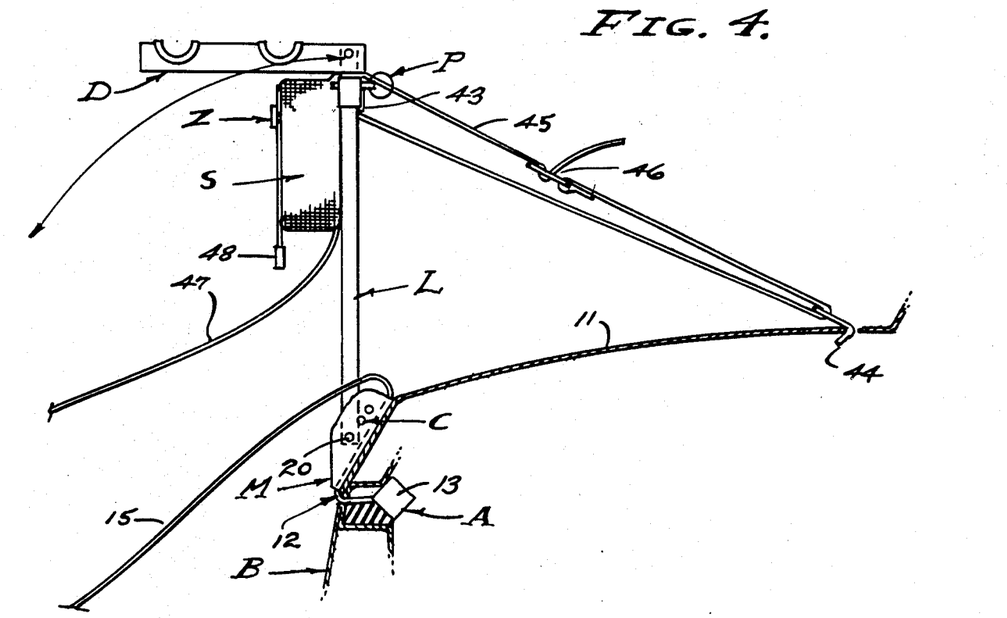
FIG. 4 is a sectional view taken as indicated by line 4—4 on FIG. 1, showing the load carrier in elevation, in its erected working condition.

Referring now to FIG. 1 of the drawings, the load carrier is shown assembled and in its erected working condition installed on the rear end of a vehicle or auto body B. As shown in FIG. 4 of the drawings, there is an anchor means A captured within the trunk cavity 10, or auto body interior, and securing a mounting bracket M at the exterior of the body B for support of an upstanding leg L to which is attached a load bearing header H. In practice, here is a pair of like and preferably identical mounting bracket-leg assemblies (M-L) to which the header H is rigidly pinned in the assembled erected condition. The mounting bracket-leg assemblies are spaced transversely of the auto body B by the header H, the header being drawn forwardly into a stopped position determined by adjustment means C incorporated in the mounting brackets M. Tensioning means T extending from the header H to the auto body B forward of the header draws the load carrier into secure working position. Rearwardly extending davits D are rigidly pinned to the legs L at the header level, and to which at least one or more bicycle top frame members can be supported. The assembled and erected condition is established by the insertion of removeable pins P, or the like, and a feature of the invention is the permanency of a dual purpose stowage sack S shown inside-out in the erected condition where it is adapted to store miscellaneous gear for transport with the external load supported by the header H and/or by the davits D. Securement straps 47 are attached to the stowage sack S.

Figure 2:
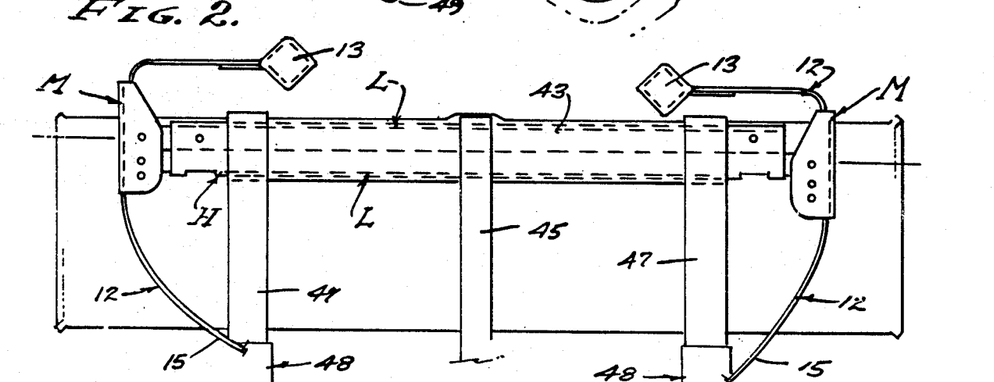
FIG. 2 is an enlarged view taken from the forward facing side of the stowage sack in its inside-out condition, and showing the reassembled condition of the carrier members for storage.
Figure 3:
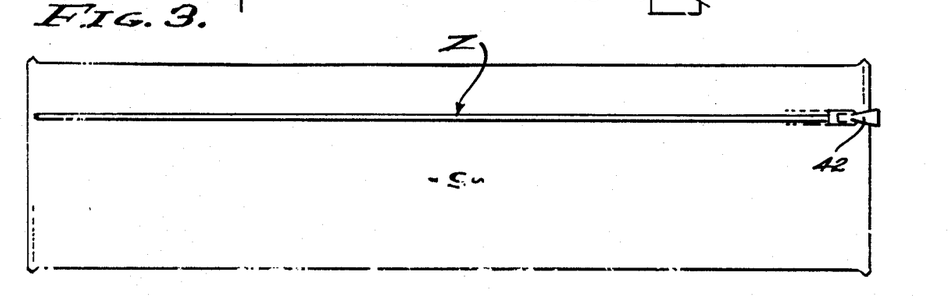
FIG. 3 is a view similar to FIG. 2 taken from the forward facing side of the reassembled condition, and showin the stowage sack in its right-side-out condition with its zipper closed and the carrier members stored therein.

Referring now to FIG. 2 of the drawings, the load carrier is shown disassembled and in its reassembled stored condition stowed with the dual purpose sack S in its inside-out condition. The parts and members of the erected load carrier having been disassembled by removal of the securement pins P, they are then reassembled by telescopically inserting the two legs L into opposite ends of the header H, with the mounting brackets M pivoted thereto and exposed at the opposite ends of the header. The dual purpose sack S is then turned right-side-out so as to envelope the reassembly and also to receive the two davits D which are loose, and after which the sack S is closed as by means of a zipper Z, as shown in FIG. 3.

Figures 11, 12, 13, 14:
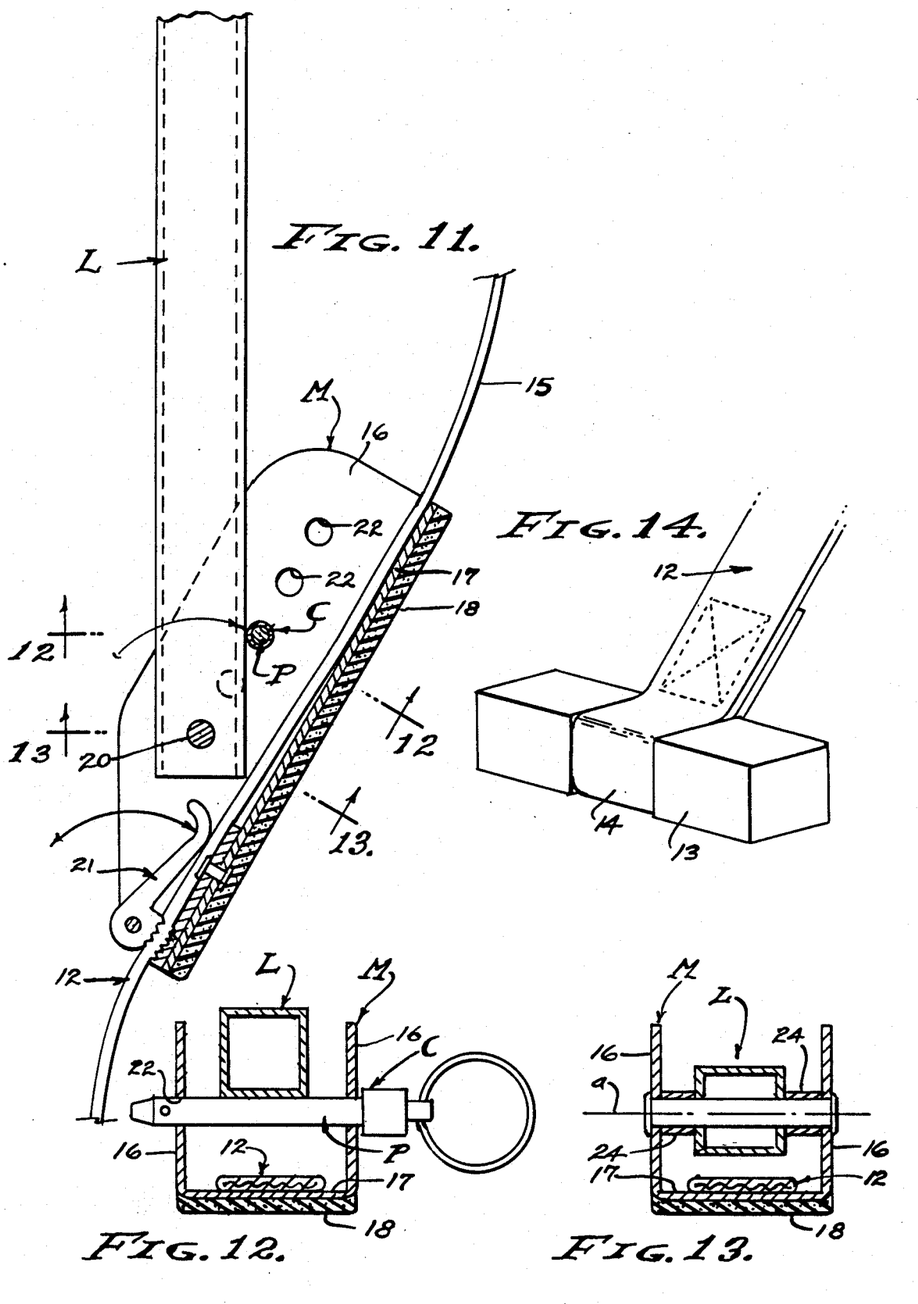

The vehicle or auto body B can vary in design and construction, a typical body having a trunk with a lid 11 being shown. It is to be understood that the body style might be that of a sedan, a coupe, a station wagon, or a hatch-back, etc., providing that there is a lid or door that closes at a lower level against a sill, and preferably against a depressible seal leaving a gap or "crack" in the bodywork. This crack extends transversely in a horizontal plane and is about one sixteenth to one quarter inch in separation, and thereby is adapted to pass a flexible strap without pinching or damaging the same. Furthermore, the the depressible seal also yields to the strap passing through the closed joint of the bodywork, when the lid 11 or door is closed. In accordance with this invention, the anchor means A involves a flexible strap 12 of woven belting that passes through the bodywork crack of the closed trunk lid 11 or the like. The auto body or trunk interior cavity is unobstructed at the sill where the strap 12 emanates when passing through the crack. Accordingly, the anchor means A includes an enlargement 13 secured to what I will term the dead end of the anchor strap 12. The enlargement 13 is a wooden block or the like notched to receive a loop 14 at the dead end of the strap 12, such as to be captured against the inside of the sill at the interior of the trunk, since it cannot pass through the bodywork crack. Thus, the strap 12 has a positive stopped position as and when the strap is drawn tight through the bodywork crack. The live end 15 of each strap 12 extends freely from the bodywork crack and through adjustment means on a mounting bracket M.

The mounting bracket-leg assembly (M-L) each involves a straight leg L, preferably of square tubular cross section, and a mounting bracket M, preferably with spaced ears 16 carried by a flat base 17. The base 17 is adapted to bear flat against the exterior of the trunk lid 11 immediately above the lower edge thereof where the strap 12 emanates above the sill, with padding 18 coextensive with the base to engage the bodywork. The mounting bracket M has a transverse and horizontally disposed pivot 20 that extends between the ears 16 to pivotally carry the leg L and dividing the mounting bracket into upper and lower portions. The lower portion of the mounting bracket M includes an adjustment means comprised of an adjustable strap buckle 21 through which the live end of the strap 12 is drawn and adjustably secured with the lower edge of the mounting bracket positioned immediately above the trunk lid crack. The upper portion of the mounting bracket M includes an adjustment means C comprised of one or more and preferably at least two pairs of adjustment holes 22 aligned through the ears 16 to selectively receive a removeable bolt or pin P for angularly positioning the leg L with respect to the flat base 17. In practice, releasable push-pins are employed that can be manually released and reset, so as to be instantly removed and replaced through the pairs of holes 22 as may be required. As shown, the leg L pivots on pivot 20 and stops against the selectively positioned pin P. Accordingly, the leg or legs L can be adjusted, for example to an upstanding and erect position as shown.

The mounting bracket M is of channel-shaped cross section, substantially greater in width than the square cross section of the leg L, the pivot 20 being a bolt or pin secured in place by a nut or cotter, or preferably by riveting. In practice, the legs L are ¾ inch square tubing, and the ears 16 of the mounting brackets are spaced 1½ inches apart, there being a pair of sleeves 24 carried over the pivot 20 at each side of the legs to center the same within the brakets. Accordingly, the legs L swing rearwardly from the auto body B on a transverse horizontal axis a, when the load carrier is installed with the mounting brackets vertically disposed and with the mounting bracket bases 17 flat against the exterior of the auto body trunk lid 11 immediately above the sill and crack established by the lid in its closed condition. Although the placement of the parts of alignment holes 22 can be varied as required, a typical placement is such that one pair of holes 22 stops the leg at 30° from the plane of the base 17, and the other pair of holes 22 stops the leg at 15° from said plane, and so that the leg will be positioned at said related angle when drawn forwardly by the tensioning strap T. In practice, the legs L are each approximately 2 feet in length with side walls passing the pivot 20 on axis a through its lower end portion, and with front and back walls passing a securement pin P on an axis b through its upper end portion. The legs L being of square cross section, the axis b in each instance is longitudinally disposed when the carrier is erected and in working position with the header H extending between said upper portions of the two legs L, as next described.

The header H is the main structural part, in that it ties the two legs L together when assembled in the working condition and/or re-assembled in the stored condition. In accordance with this invention, the bracket H is of rectangular cross section adapted to slideably receive the two legs L simultaneously inserted therein, and the header H has what I will term front and back walls 25 and 26 spaced to slideably receive and pass the square dimension of the tubular leg cross section. Being of rectangular cross section, the header H has what I will term top and bottom walls 27 and 28 spaced to slideably receive and pass two or double square dimensions of the tubular leg cross sections. In practice, the header H is shorter than the lengths of legs L, whereby the two legs can be slideably inserted side by side into the tubular header, with one or both ends of the legs projecting from the header in the stored condition and with the mounting brackets M attached and exposed outside the open ended header; one mounting bracket M at each end of the header (this is the re-assembled condition).

Figures 5, 6, 7:
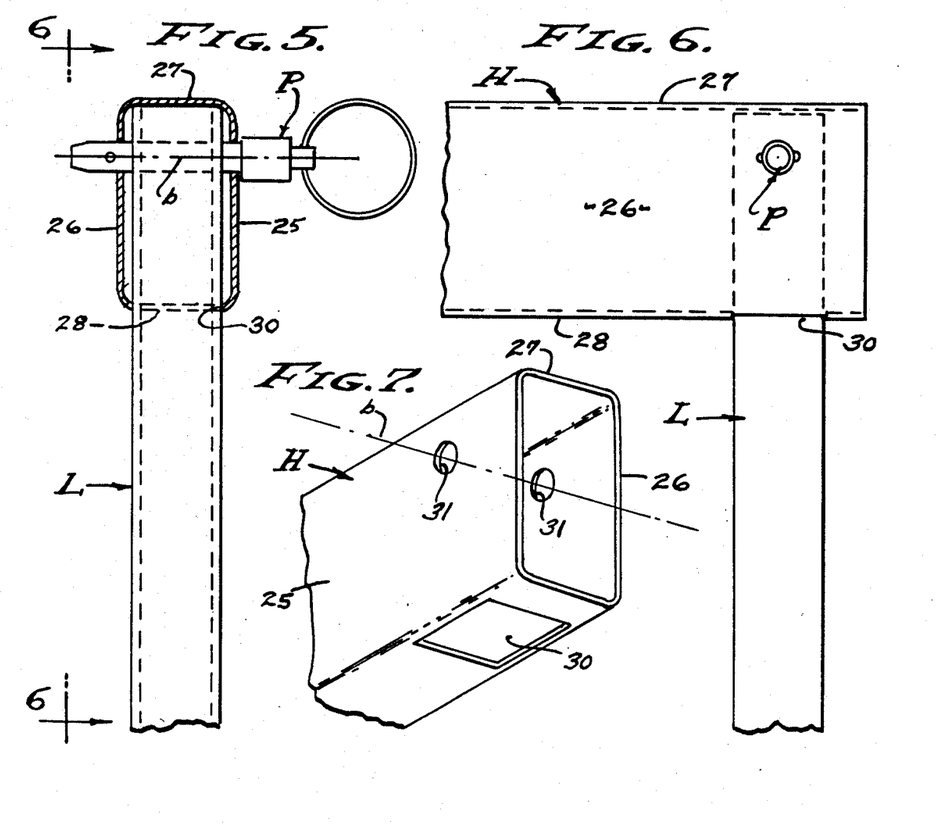

The header H is an open-ended tube member, and in accordance with this invention its end portions are releasably and rigidly attached to the aforesaid upper end portions of the legs L respectively. To this end each opposite end portion of the header H has a square opening 30 through the bottom wall 28 to slideably pass the upper end portion of the leg. In the first and basic embodiment, the terminal top end of the leg stops against the inside of the top wall 27, there being a pair of securement holes 31 through the front and back walls 25 and 26 to align with a pair of securement holes through the open end portion of leg L, in each instance, to receive a replaceable securement pin P. Insertion of the upper leg end portion through the square opening 30, and insertion of the securement pin P through the securement holes 31 results in a rigid right angular connection of the members L and H; an assembly for the working condition that can be quickly disassembled as circumstances require.

Figures 8, 9, 10:
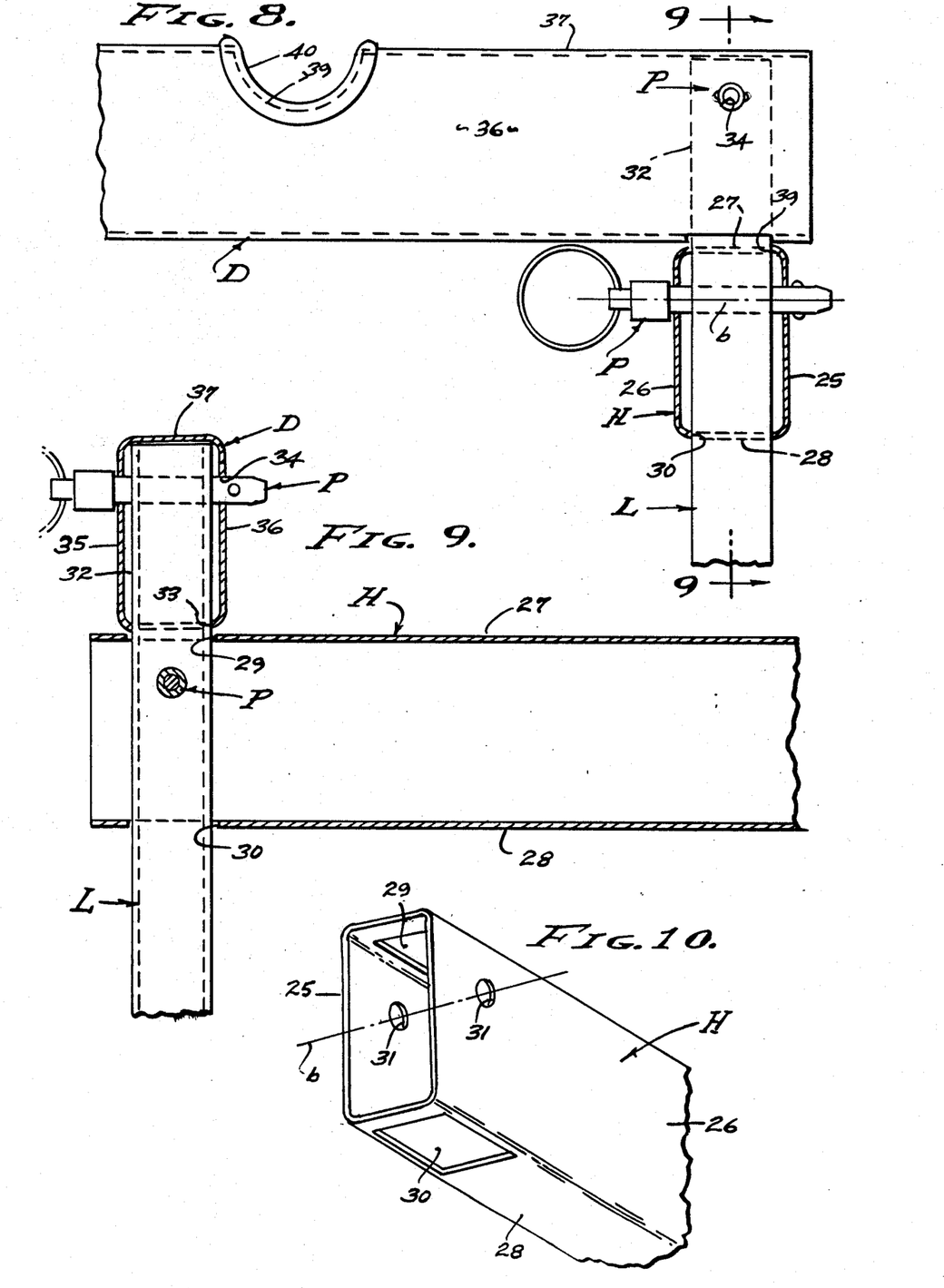

In the second and more sophisicated embodiment, there is also a square opening 29 through the top wall 27 of the header H, to slideably pass an extension 32 of the upper end portion of the leg L, in each instance. The extension 32 is of sufficient extent to receive a rearwardly projecting davit D, the right angular connection thereof otherwise being the same as above described with a manually inserted securement pin P passing through the securement holes 31. The davits D are alike, and in practice they are preferably of the same cross seciton as the header H with a square opening 33 through the bottom wall 38 to slideably pass the upper end extension 32 of the leg. The terminal top end of the leg extension stops against the inside of the top wall 37, there being a pair of securement holes 34 through the walls 35 and 36 to align with a pair of transversely disposed securement holes through the upper extension of the leg. As shown, the top of the davit D is notched at 39 to receive and position the top bar of a bicycle frame, or the like, with padding 40 for protection, as shown.

A feature of this invention is the collapsibility of the assembled condition of the load carrier and its reassembled condition for compact storage, and particularly the permancy of the stowage sack S that serves dual purposes. The stowage sack S is comprised of an elongated envelope 40 having a coextensive slide fastener or the like for its access and closure. As shown, a slide fastener or Zipper Z is employed, the slide having inside and outside tabs 41 and 42 for manipulation. The zipper Z extends along and near the top of the sack S and parallel to a sock portion 43 thereof that tightly passes the header H, with the opposite ends of the header exposed to receive the legs L. When the load carrier is erected and in its working condition, the sack S is turned inside-out with the inside pull tab 41 exposed, whereby the sack is supported by the header H and can be loaded with miscellaneous articles and the zipper Z closed. The securement straps 47 are permanently attached to the inside of the sack S, one at each end of the sock 43, so as to be exposed for use when the sack S is inside-out as shown in FIGS. 1 and 4. Each strap 47 has a buckle 48 for securment of the load, for example to draw a bicycle frame tightly against the cushioning sack S. Alternately, the load carrier is disassembled and re-arranged into its aforesaid reassembled condition (see FIG. 2); the double telescoped insertion of the two legs L into the header H, after which condition the sack S is turned right-side-out with the outside pull 42 exposed (see FIG. 3), and whereby the sack envelopes the straps and buckles 47-48 and the reassembly, and is also loaded with the davits D and the securement pins P, and the zipper Z closed. Note that the sock portion 43 permanently attaches to the assembled and/or reassembled load carrier, alternately for installed use on an auto body B or for compact storage in the auto trunk cavity.

From the foregoing it will be understood that the two legs L and the one header H are removed from a stored condition within the sack S which is turned inside-out to expose the straps and buckles 47 and 48 and for use as an envelope carrier for miscellaneous articles. The load carrier is assembled from the three members L and H, by means of removeable securement pins P, by which rigid right angular joinder is reliably established. The straps 12 of the anchor means A are then laid over the sill of the trunk cavity or auto body door opening, with the enlargements 13 placed within the interior cavity, whereupon the lid 11, or door, is closed so as to capture the enlargements 13 with the straps 12 emanating at the exterior of the bodywork. The two straps 12 are then pulled or drawn tight through the adjustable strap buckles 21, with the mounting brackets M positioned as described. The free live ends 15 of the straps 12 are extended as shown, and one strap has double rings or a buckle 49, so that one strap 12 can be joined with the other to secure a load such as a bicycle or the like. Final securement of the load carrier stopped by the selectively positioned pins P of the adjustment means C, in the erected working position, is by the tightened adjustment of the tensioning means T extending forwardly from the center of header H to a hook 44 engaged over the front edge of the trunk lid 11. The means T is comprised of a strap 45 permanently secured to the header and with its live end adjusted as to length by an adjustable buckle 46, with the hook 44 anchored over the trunk lid as shown, and such that it can be used as a tackle and thereby operate the load carrier about the axes a as a derrick or crane.

The tensioning means T can be used or replaced by a block and tackle, in which case the load carrier articulates on the axes a in the form of a derrick. In the more sophisticated embodiment, the davits D are installed to carry one or more bicycles or any such load as the case may be, the davits projecting rearwardly in the form of a crane which also articulates on the axes a. The load carrier can be used in a static condition stopped by the pins P of the adjustment means C, or it can be used dynamically as a derrick or crane to lift objects as by means of said block and tackle form of the means T.

Having described only the typical preferred forms and applications of my invention, I do not wish to be limited or restricted to the specific details herein set forth, but wish to reserve to myself any modifications or variations that may appear to those skilled in the art as set forth within the limits of the following claims.

I claim:

1. A load carrier for removable installation onto a lid closing a cavity defined by the interior of a vehicle body, the lid having a lower edge closely spaced from a sill of the body and having an upper edge closely spaced from the body, and including;

a pair of spaced mounting bracket-leg assemblies and each having a mounting bracket with a base engageable onto the exterior of the lid immediately above the lower edge thereof, and each having a leg pivoted to its bracket to swing upwardly and forwardly to an erected position against a stop, an anchor means for each mounting bracket and securing it against the body, a header extending between and attached to the ends of the pair of legs remote from their ends pivoted to their mounting brackets, and a tensioning means extending from the header to a hook engaged over the upper edge of the lid.

2. The load carrier for a vehicle body as set forth in claim 1, wherein the base of each mounting bracket is flat for coextensive engagement upon that portion of the lid by which it is supported.

3. The load carrier for a vehicle body as set forth in claim 1, wherein the stops for the erected positions of the legs are adjustment means determining said erected positions thereof.

4. The load carrier for a vehicle body as set forth in claim 1, wherein the stops for the erected positions of the legs are adjustment means comprised of selectively positioned pins determining said erected positions thereof.

5. The load carrier for a vehicle body as set forth in claim 1, wherein each anchor means is comprised of a block placed within the cavity and attached to the dead end of a strap emanating between the lower edge of the lid and sill of the body and attached to the mounting bracket.

6. The load carrier for a vehicle body as set forth in claim 5, wherein the strap of each anchor means is adjustably attached to its mounting bracket by a buckle.

7. The load carrier for a vehicle body as set forth in claim 1, wherein the tensioning means is comprised of a strap adjusted as to length by a buckle.

8. The load carrier for a vehicle body as set forth in claim 1, wherein a stowage sack is attached to the header and extends beyond the attachment thereto of the legs at opposite ends of the header, the sack having an opening closure coextensive to opposite ends thereof, the sack being reversible from a right-side-out condition to an inside-out condition whereby it is adapted to receive miscellaneous articles in one condition for transport when the load carrier is installed on the vehicle body, and is alternately adapted to receive the leg assemblies and header in the other condition for storage thereof.

9. The load carrier for a vehicle body as set forth in claim 1, wherein the legs are pivoted to the brackets on substantially aligned axes, and wherein the tensioning means adjustable as to length as a tackle operates the load carrier as a crane.

10. The load carrier for a vehicle body as set forth in claim 1, wherein each anchor means is comprised of a block placed within the cavity and attached to the dead end of a strap emanating between the lower edge of the lid and sill of the body and attached to the mounting bracket and extending substantially therefrom as strap for securing the load.

11. The load carrier for a vehicle body as set forth in claim 1, wherein each anchor means is comprised of a block placed within the cavity and attached to the dead end of a strap emanating between the lower edge of the lid and sill of the body and attached to the mounting bracket and extending substantially therefrom as a strap and one of which has a buckle to connect with the other for securing the load.

12. The load carrier for a vehicle body as set forth in claim 1, wherein a stowage sack is attached to the header and extends beyond the attachment thereto of the legs at opposite ends of the header, the sack having an opening closure coextensive to opposite ends thereof, at least one securement strap permanently attached to the sack, the sack being reversible from a right-side-out condition whereby it is adapted to receive miscellaneous articles in one condition for transport when the load carrier is installed on the vehicle body, and is alternately adapted to enclose the securement strap and to receive the leg assemblies and header in the other condition for storage thereof.

13. The load carrier for a vehicle body as set forth in claim 1, wherein a stowage sack is attached to the header and extends beyond the attachment thereto of the legs at opposite ends of the header, the sack having an opening closure coextensive to opposite ends thereof, a pair of securement straps and one of which has a buckle to connect with the other and both of which are permanently attached to the sack, the sack being reversible from a right-side-out condition to an inside-out condition whereby it is adapted to expose said securement straps and to receive miscellaneous articles in one condition when the load carrier is installed on the vehicle body, and is alternately adapted to enclose the securement straps and to receive the leg assemblies and header in the other condition for storage thereof.

14. A load carrier for removable assembled installation onto a lid closing a cavity defined by the interior of a vehicle body, and for disassembly and re-assembly into a compact storage condition, the lid having a lower edge closely spaced from a sill of the body and having an upper edge closely spaced from the body, and including;
    a pair of spaced mounting bracket-leg assemblies and each having a mounting bracket with a base engageable onto the exterior of the lid immediately above the lower edge thereof, and each having a leg pivoted to its bracket to swing upwardly and forwardly to an erected position against a stop,
    an anchor means for each mounting bracket and securing it against the body,
    a header of tubular cross section extending between and releasably attached to the upper ends of the pair of legs remote from their ends pivoted to their mounting brackets when in an assembled installation condition,
    a tensioning means extending from the header to the body,
    and the tubular cross section of the header being of a configuration to simultaneously receive the pair of legs inserted into the tubular cross section through an open end thereof after disassembly and removal from the first mentioned assembled installation condition for reassembly into the compact storage condition.

15. The load carrier for a vehicle body as set forth in claim 14, wherein the vehicle body has a cavity defined by the interior of the body and a lid closing said cavity and having a lower edge closely spaced from a sill, and wherein each anchor means is comprised of a block placed within the cavity and attached to the dead end of a strap emanating between the lower edge of the lid and the sill of the body and attached to the mounting bracket.

16. The load carrier for a vehicle body as set forth in claim 14, wherein the legs are of squared cross section, and wherein the header is of rectangular cross section to simultaneously receive the legs inserted therein.

17. The load carrier for a vehicle body as set forth in claim 14, wherein opposite ends of the header are releasably attached to the upper ends of each leg by means of an opening through the bottom of the header with the upper end portions of the legs fitted through said openings and into the header and secured by removable pins projecting through the legs and header.

18. The load carrier for a vehicle body as set forth in claim 16, wherein opposite ends of the header are releasably attached to the upper ends of each leg by means of a squared opening through the bottom of the header with the upper end portion of the leg fitted through said opening and into the header and secured by a removable pin projecting through the leg and the header.

19. The load carrier for a vehicle body as set forth in claim 14, wherein a stowage sack is permanently attached to the header and extends beyond the attachment thereto of the legs at opposite ends of the header, the sack having an opening closure coextensive to opposite ends thereof, the sack being reversible from a right-side-out condition to an inside-out condition whereby it is adapted to receive miscellaneous articles in one condition for transport when the load carrier is installed on the vehicle body, and is alternately adapted to receive the leg assemblies and header in the other condition for storage thereof.

20. A load carrier for assembled installation onto a lid closing a cavity defined by the interior of a vehicle body, and for disassembly and reassembly into a compact storage condition, the lid having a lower edge closely spaced from a sill of the body and having an upper edge also closely spaced from the body, and including;
    a pair of spaced mounted bracket-leg assemblies and each having a mounting bracket with a base engageable onto the exterior of the lid immediately above the lower edge thereof, and each having a leg pivoted to its bracket to swing upwardly and forwardly to an erected position against a stop,
    an anchor means for each mounting bracket and securing it against the body,
    a header of tubular cross section extending between and releasably attached to the upper ends of the pair of legs when in an assembled installation condition,
    a tensioning means extending from the header to a hook engaged over the upper end of the lid,
    and the tubular cross section of the header being of a configuration to simultaneously receive the pair of legs inserted therein after disassembly from the first mentioned assembled installation condition and reassembly into the compact storage condition.

21. The load carrier for a vehicle body as set forth in claim 20, wherein the vehicle body has a cavity closed by the lid, and wherein each anchor means is comprised of a block placed within the cavity and attached to the dead end of a strap emanating between the lower edge of the lid and the sill of the body and attached to the mounting bracket thereby.

22. The load carrier for a vehicle body as set forth in claim 20, wherein the legs are of squared cross section, and wherein the header is of rectangular cross section to simultaneously receive the legs inserted therein.

23. The load carrier for a vehicle body as set forth in claim 20, wherein opposite ends of the header are releasably attached to the upper ends of each leg my means of an opening through the bottom of the header with the upper end portions of the legs fitted through said openings and into the header and secured by removalbe pins projecting through the legs and header.

24. The load carrier for a vehicle body as set forth in claim 20, wherein opposite ends of the header are releasably attached to the upper ends of each leg by means of a squared opening through the bottom of the header with the upper end portion of the leg fitted through said opening and into the header and secured by a removable pin projecting through the led and header.

25. The load carrier for a vehicle body as set forth in claim 20, wherein a stowage sack is attached to the header and extends beyond the attachment thereto of the legs at opposite ends of the header, the sack having an opening closure coextensive to opposite ends thereof, the sack being reversible from a right-side-out condition to an inside-out condition whereby it is adapted adpated to receive miscellaneous articles in one condition for transport when the load carrier is installed on the vehicle body, and is alternately adapted to receive the reassembled leg assemblies and header in the other condition for storage.

26. The load carrier for a vehicle body as set forth in claim 20, wherein the legs are pivoted to the brackets on substantially aligned axes, and wherein the tensioning means adjustable as to length as a tackle operates the load carrier as a crane.

27. A load and lift carrier for assembled installation onto a vehicle body and for disassembly, and including;
a pair of spaced mounting bracket-leg assemblies and each having a mounting bracket with a base engageable onto the exterior of the body, and each having a leg extending upwardly to an erected position,
an anchor means for each mounting bracket and securing it onto the body,
a header of tubular cross section extending between and releasably attached at its opposite ends to the upper ends of the pair of legs by means of openings through the bottom and top walls thereof to pass the upper portions of the legs with projecting portions above the header, and secured by removable pins projecting through the legs and the header,
a tensioning means adjustable as to length and extending from the header to the body,
and the projecting portion of each leg carrying a rearwardly extending tubular davit releasably attached thereto by means of an opening through the bottom of the davit with the projecting portion of the leg fitted through said opening and into the davit and secured by a removable pin projecting through the leg and the davit.

28. The load carrier for a vehicle body as set forth in claim 27, wherein a stowage sack is attached to the header and extends beyond the attachment thereto of the legs at opposite ends of the header, the sack having an opening closure coextensive to opposite ends thereof, the sack being reversible from a right-side-out condition to an inside-out condition whereby it is adapted to receive miscellaneous articles in one condition for transport when the load carrier is installed on the vehicle body, and is alternately adapted to receive the leg assemblies and header in the other condition for storage thereof.

29. The load carrier for a vehicle body as set forth in claim 27, wherein the legs are of squared cross section, and wherein the header and davit are each of rectangular cross section into which the legs are slideably enageable when disassembled for reassembly into a compact storage condition.

30. The load carrier for a vehicle body as set forth in claim 27, wherein the legs are pivoted to the brackets on substantially aligned axes, and wherein the tensioning means adjustable as to length as a tackle operates the load carrier as a crane.

* * * * *